United States Patent [19]

Beavers et al.

[11] Patent Number: 4,939,009

[45] Date of Patent: Jul. 3, 1990

[54] MULTILAYERED SHEETS HAVING EXCELLENT ADHESION

[75] Inventors: Randy S. Beavers, Kingsport; Bradley L. Willingham, Mount Carmel; Richard V. Brooks; Michael C. Carmody, both of Kingsport; Burns Davis, deceased, late of Kingsport, all of Tenn., by Bessie Anne Davis

[73] Assignee: Eastman Kodak Company, Rochester, N.Y.

[21] Appl. No.: 317,884

[22] Filed: Feb. 27, 1989

Related U.S. Application Data

[63] Continuation-in-part of Ser. No. 169,556, Mar. 17, 1988, abandoned.

[51] Int. Cl.$^5$ .............................................. B32B 27/08
[52] U.S. Cl. ................................... 428/35.2; 428/483; 428/516; 428/520

[58] Field of Search .................... 428/35.2, 483, 516, 428/520, 44, 45; 383/113

[56] References Cited

U.S. PATENT DOCUMENTS

| | | | |
|---|---|---|---|
| 4,119,267 | 10/1978 | Kydonieus | 229/53 |
| 4,210,686 | 7/1980 | Gajewski et al. | 428/35 |
| 4,349,469 | 9/1982 | Davis et al. | 524/765 |
| 4,643,926 | 2/1987 | Mueller | 428/35 |
| 4,705,707 | 11/1987 | Winter | 428/35 |

FOREIGN PATENT DOCUMENTS 0056323  7/1982  United Kingdom .

*Primary Examiner*—James Seidleck
*Attorney, Agent, or Firm*—John F. Stevens; William P. Heath, Jr.

[57] ABSTRACT

Disclosed are multilayered sheets or films which have excellent adhesion. The sheets or film comprise a layer of copolyesterether or copolyester bonded to a layer of polyolefin by means of a tie layer of a copolymer of ethylene and at least one other unsaturated monomer.

12 Claims, No Drawings

MULTILAYERED SHEETS HAVING EXCELLENT ADHESION

This application is a continuation-in-part of copending application Ser. No. 169,556 filed Mar. 17, 1988, now abandoned.

TECHNICAL FIELD

This invention relates to multilayered films or sheets which have excellent adhesion. More particularly, the invention relates to multilayered sheets wherein a tie layer of a particular polyethylene is used to bond layers of copolyester or copolyesterether with polyolefin. The sheets are articularly useful in Forming containers for intravenous solutions where water barrier properties, as well as excellent adhesion properties both before and after autoclaving, are important. Also, because of the sheet having excellent adhesion, both between layers and to other substrates, it is especially useful as a carrier for decorative and protective coatings to be applied to substrates such as automobile panels.

BACKGROUND OF THE INVENTION

As used herein, certain terms are defined as follows:

"Polyolefin" means polyethylene, polypropylene, ethylene/propylene copolymer and polyallomer, and such polyolefins containing rubber, such as ethylene/propylene rubber (EPR) modified polypropylene block copolymer.

"Sheets" or "sheet material" includes thin film material as well as heavier sheets.

Copolyesterethers are tough flexible materials and can be extruded into clear sheets. Such sheets are particularly useful in the packaging of intravenous solutions. However, water tends to have a high diffusion rate through these Films and intravenous solutions packaged in these materials lose water from the solution. While the loss from the intravenous solution has been solved by using an outer overwrap or the intravenous solution container, this is undesirable because of expense and having to make two separate bags For each solution.

This invention, in one aspect, provides multilayered clear flexible films which may be formed by coextrusion. These films have excellent water vapor barrier properties and excellent adhesion before and after autoclaving. They have three or more layers and consist of at least one layer each of a flexible copolyesterether, a water vapor barrier layer of a polyolefin and an adhesive or tie layer for bonding the copolyesterether layer to the polyolefin layer. These films can be formed into containers for materials such as intravenous solutions.

By using layers of the copolyesterether, tie layer and polyolefin, films can be constructed with excellent water vapor barrier and adhesion before and after autoclaving. Polyolefins are excellent water vapor barriers, but are rigid. However, thin layers have sufficient flexibility and water barrier properties. Since copolyesterethers and polyolefins in general do not adhere to each other even when brought together in the melt, it is necessary to use an intermediate adhesive or tie layer that will stick to both the copolyesterether and polyolefin layers. The adhesive or tie layer must provide good adhesion before and after autoclaving to prevent delamination in the container.

Patents of interest include U.S. Pat. Nos. 4,643,926; 4,119,267; 4,210,686 and 4,349,469. The '926 patent discloses a flexible film comprising several layers of polymeric material. For example, one of the flexible films disclosed comprises a polyallomer and a flexible copolyester (such as the copolyesterether described herein) tied together with various tie layers (for example, an ethylene propylene copolymer, Column 4, lines 7 and 8). Applicants' examples indicate unexpected improved results in adhesion using the low molecular weight polyethylene with a Flow rate of 0.25 to 40, over the tie layers disclosed by this reference. Furthermore, published technical literature by Mitsui petrochemical Industries, Ltd., directed to Admer resins discloses the utility of low molecular weight polyethylene resins as adhesive layers between various materials including certain plastics. However, we have not found a disclosure or suggestion that these resins are particularly effective as a tie layer between copolyesterether or certain copolyesters and polyolefins as called for herein.

There are, of course, other instances where it may be desirable to bond copolyesterethers, certain copolyesters (or blends thereof) to polyolefins. For example, copolyesterethers or copolyesters may be used as carrier sheets for decorative and/or protective coatings to be applied to polyolefin material.

DESCRIPTION OF THE INVENTION

According to one aspect of the present invention, there are provided multilayered films having excellent water barrier properties and excellent adhesion, even after being subjected to autoclaving conditions (high temperature, humidity, etc.). The films are normally coextruded into three or five layered structures, i.e., A-B-C or A-B-C-B-A, wherein A is copolyesterether, B is a low molecular weight polyethylene resin as defined herein, and C is a polyolefin layer.

It is necessary that the layered sheet according to this aspect of the invention have a copolyesterether layer, a polyolefin layer and a tie layer between each copolyesterether and polyolefin layer. The number of layers needed in the Film will usually be determined by the end use. In the case of a 3-layered film, there would be a copolyesterether outer layer, a center tie layer and a polyolefin outer layer. If it is desired to have a copolyesterether layer on both sides of the (film, then a 5-layered film would be suitable.

The layered films of this aspect of the invention can range in total thickness of from 3 or 4 mils to about 50 mils. The preferred thickness ranges from about 4 to about 20 mils for packaging materials. The thickness of the various layers can vary greatly depending on the desired properties. In general the tie layer will range from 0.2 mil to 3 mils.

The preferred copolyesterethers used in this invention are described in U.S. Pat. No. 4,349,469, which is incorporated herein by reference. These are copolyesterethers based on 1,4-cyclohexanedicarboxylic acid, 1,4-cyclohexanedimethanol, and poly(oxytetramethylene) glycol or as named in the '469 Patent, polytetramethylene ether glycol. The copolyesterether is available commercially from Eastman Chemical Products, Inc., and is available in three commercial grades: ECDEL -9965, ECDEL -9966, and ECDEL -9967 resins.

Thus, the films of this aspect of the present invention have layer combinations comprising copolyesterether, tie and polyolefin layers, the copolyesterether having an I.V. of about 0.8 to 1.5 and recurring units from (1) a dicarboxylic acid component consisting essentially of 1,4-cyclohexanedicarboxylic acid having a trans isomer content of at least 70%, (2) a glycol component consisting essentially of
   (a) about 95 to about 65 mol % 1,4-cyclohexanedimethanol, and
   (b) about 5 to about 35 mol % poly(oxytetramethylene) glycol having a molecular weight of about 500 to about 1100, the tie layer being a low molecular weight polymer having ethylene repeat units, a melt flow rate of about 0.5 to about 20, a tensile strength at break of at least 25 kg/cm$^2$, an elongation at break of greater than 400% and a melting point of at least 65° C.

The dibasic acid component of the polyesterether consists essentially of 1,4-cyclohexanedicarboxylic acid having a trans isomer content of at least 70%, preferably at least 80% and most preferably at least 85% trans isomer content.

1,4-Cyclohexanedicarboxylic acid and 1,4-cyclohexanedimethanol are well known in the art and commercially available. "Man-Made Fibers: Science and Technology," Vol. III, edited by Mark, Atlas and Cernia. Published by Interscience Publishers describes preparation of 1,4-cyclohexanedicarboxylic acid and 1,4-cyclohexanedimethanol at page 85.

The poly(oxytetramethylene) glycol component of the copolyesterether is commercially available, and is prepared by well known techniques. The poly(oxytetramethylene) glycol has a molecular weight of between about 500 and about 1100, preferably about 1000 (weight average).

The copolyesterether further may comprise up to about 1.5 mol %, based on the acid or glycol component, of a polybasic acid or polyhydric alcohol branching agent having at least three COOH or OH functional groups and from 3 to 60 carbon atoms. Esters of many such acids or polyols may also be used. Suitable branching agents include trimellitic acid or anhydride, trimesic acid, trimethylol ethane, trimethylol propane, and trimer acid.

It should be understood that the total acid reactants should be 100%, and the total glycol reactants should be 100 mol %. Although the acid reactant is said to "consist essentially of" 1,4-cyclohexanedicarboxylic acid, in the branching agent is a polybasic acid or anhydride, it will be calculated as part of the 100 mol % acid. Likewise, the glycol reactant is said to "consist essentially of" 1,4-cyclohexanedimethanol and poly(oxytetramethylene) glycol, if the branching agent is a polyol, it will be calculated as part of the 100 mol % glycol.

The copolyesterethers preferably include a phenolic antioxidant. It is preferred that the phenolic antioxidant be hindered and relatively non volatile. Tetrakis [methylene(3,5di-tert-butyl-4-hydroxyhydrocinnamate)methane] which is commercially available from Geigy Chemical Company as Irganox 1010 antioxidant, is preferred. Preferably, the antioxidant is used in an amount of from about 0.1 to about 1.0, based on the weight of copolyesterether.

The trans and cis isomer contents of the final copolyesterether are controlled in order to give polymers that setup or crystallize rapidly. Cis and trans isomer contents are measured by conventional methods well known to those skilled in the art. See, for example, U.S. Pat. No. 4,349,469.

The copolyesterether used in this invention may be prepared by conventional techniques. See for example, U.S. Pat. No. 4,349,469.

The tie layers used in this aspect of the invention are of a low molecular weight polyethylene having a melt flow rate of about 0.5 to about 20.0 g/10 min, preferably about 1.0 g/10 min, as measured according to ASTM-D1238. Such low molecular weight polyethylene is available commercially from Mitsui petrochemical Industries, Ltd.. as ADMER AT-469C adhesive polyolefin resin. Admer AT-469C is described as having a melt flow rate (190° C.) of 1.0 g/10 min (ASTM-D1238) a density of 0.88 g/cm (ASTM-D1505), a tensile strength at break of 30 kg/cm (ASTM-D638), an elongation at break of >500% (ASTM-D638), Izod impact strength of unbreakable (ASTM-D256), a D-shore hardness of 16 (ASTM-D2240), and A-shore hardness of 72 (ASTM-D2240), a melting point of 75° C. (DSC), and excellent clarity.

Suitable polyolefins useful as the moisture barrier layer(s) are commercially available, and include such materials as polypropylene-4240 (melt flow rate of 9.0 g/10 min) and polyallomer-5L2S (melt flow rate of 6.0 g/10 min), available from Eastman Chemical Products, Inc. and Shell polypropylene WRS7-327 (melt flow rate of 8.0 g/10 min). Polyolefins used have a melt flow rate or about 4 to 20, preferably about 5 to 12.

The films according to the present invention are preferably formed by coextrusion using conventional techniques. A hot blown process may also be employed, although optical properties of the resulting pouch would be inferior to those from a cast coextrusion process.

An important property of a flexible medical solution bag is the moisture vapor transmission rate (MVTR). Typically, the concentrations of the medical solutions inside the pouch must be carefully maintained. Pouches or bags currently made from PVC require moisture barrier materials in an overwrap arrangement, i.e., a separate overwrap material, to insure that the concentration of solutions obtained in the pouch is not affected.

It is also important that the multilayered film have sufficient adhesion between layers to prevent separation during autoclaving condition.

In another aspect of this invention, the multilayered sheets according to this invention are also useful in the preparation of sheets for laminating to substrates such as polyolefin panels used in making appliances, automobiles, etc. In such cases, the sheet preferably contains three layers. One outer layer is copolyester, copolyesterether or blend thereof. The other outer layer is polyolefin as defined above. Sandwiched therebetween, for bonding them together, is a tie layer as described below. Alternately, the sheets may contain only two layers, i.e., a layer of copolyester, copolyesterether or blend thereof and tie layer. In this case, the tie layer would be used for bonding directly to a polyolefin substrate either by thermoforming or in-mold processing. By "in-mold processing" it is meant that the sheet material is placed in a mold cavity, and a molding material such as molten polyolefin is injected into the mold cavity under pressure against the sheet material such that the sheet material conforms to the shape of the mold and bonds to the outer surface of the article. Also, other processes such as compression and reaction injection molding may be used.

The copolyesterether used in this aspect of the invention is the name as described above.

The copolyesters which may be used either alone or blended with the polyesterether are in general, polyesters of terephthalic acid with two or more glycols having 2 to 10 carbon atoms. The preferred glycols are ethylene glycol and 1,4-cyclohexanedimethanol, in ratios of about 20:80 to 80:20 by weight. These copolyesters are prepared using techniques well known in the art.

The tie layer used in this aspect of the invention is described as a low molecular weight polyethylene having a melt flow rate of about 0.25 to about 40.0 g/10 min., a tensile strength at break of at least 25 kg/cm$^2$, an elongation at break of greater than 100% and a melting point of at least 65° C. Thus, the tie layer used in sheet material according to this aspect of the invention may have a broader range of physical properties than that described for use with flexible containers.

The tie layer material in both aspects of this invention is a low molecular weight polymer of ethylene with about 0.1 to about 30 weight percent of at least one unsaturated monomer which can be copolymerized with ethylene, e.g., maleic acid, fumaric acid, acrylic acid, methacrylic acid, vinyl acetate, acrylonitrile, methacrylonitrile, butadiene, carbon monoxide, etc. Preferred are acrylic esters, maleic anhydride, vinyl acetate, and methyacrylic acid. Many such polymers are commercially available under trademarks such as Admer AT-469C, Lotader AX-8040, Elvax 260, Dupont CXA 136 and 3101 and Lotader HX-8020.

The polyolefin used in this aspect of the invention is the same as that described above.

The following examples are submitted for a better understanding of the invention. Examples 1 thru 9 relate to film material especially useful in flexible containers, while Examples 10 thru 16 relate to carrier sheet material especially useful for carrying protective and/or decorative coatings.

In the examples, the multilayered films are coextruded as indicated. MVTR and T peel strength are measured. The multilayered films may be made into bags or pouches by methods known in the art such as, for example, heat sealing. The coextrusion conditions are as follows:

The films are coextruded in a Prodex-Killion-Davis standard extruder. The Prodex is a 3.5 inch extruder fitted with a modified cellulosic polyolefin screw. The extruder contains a 24-80-60-24 mesh screen pack and used two take off rolls (top matte finish and bottom chrome finish). The Killion is a 1.25 inch extruder, the Davis Standard is a 1.5 inch extruder. The prodex is used to extrude the copolyesterether at 510° F. (265° C.), the Killion is used to extrude the tie layers (350° F. to 525° F.) (177° C.–274° C.) and the Davis Standard is used to extrude the polyolefin layers (450° to 550° F.) (232° C.–288° C.).

EXAMPLE 1

A three layered film prepared by coextrusion consists of an outer layer of copolyesterether as defined herein, a center tie layer and an outer layer of polypropylene-4240. The tie layer was Admer AT-469C low molecular weight polyethylene. The total film thickness was 7.5 mils and consists of 3.3 mils of copolyesterether, 1.7 mils of Admer AT-469 resin and 2.5 mils of polypropylene-4240. The film had a moisture vapor transmission rate of 0.30 g/100 in.$^2$/24 hr, while that of an equivalent thickness of the copolyesterether had 6.0 g/100 in.$^2$/24 hr. The coextruded film had a T-Peel strength of 4.4 lb/in. before autoclaving and 2.9 lb/in. after autoclaving for 1 hour at 121° C. at 15 psi.

EXAMPLE 2

A three layered film consisting of 3.3 mils of copolyesterether as defined above, 1.7 mils of Admer AT-469C resin and 2.5 mils of polyallomer 5L2S was prepared by coextrusion. The film had a MVTR of 0.30 g/100 in.$^2$/24 hr. The three layer film had a T-Peel strength of 3.7 lb/in. before autoclaving and 2.7 lb/in. after autoclaving for 1 hour at 121° C. at 15 psi.

EXAMPLE 3

A five layered film structure was prepared consisting of 1.6 mils of copolyesterether as defined above, 0.8 mil of Admer AT-469 resin, 2.5 mils of polyallomer 5L2S, 0.9 mil of Admer AT-469 resin, and 1.6 mils of the copolyesterether. The film had a MVTR of 0.32 g/100 in.$^2$/24 hr. and a T-Peel strength of 3.9 lb/in. before autoclaving and 2.6 lb/in. after autoclaving for 1 hour at 121° C. at 15 psi.

EXAMPLE 4

(Control) A three layered structure prepared by coextrusion was comprised of an outer layer of copolyesterether as defined herein, a center layer of Gulf-2205 resin tie layer and an outer layer of polypropylene-4240. The film had a total thickness of 5.0 mils, where the copolyesterether was 2.5 mils, Gulf-2205 resin 0.5 mil and the polypropylene 2.0 mils. The film had a MVTR of 0.38 g/100 in.$^2$/24 hr. The T-Peel before autoclaving was 3.2 lb/in., but after autoclaving for 1 hour at 121° C. at 15 psi the adhesion was reduced to 0.35 lb/in.

EXAMPLE 5

(Control) A three layered coextruded Film structure was prepared with 2.5 mils of copolyester ether as defined above, 0.5 mil of CXA-1104 resin tie layer and 2.0 mils of polypropylene-4240 and had a MVTR of 0.44 g/100 in.$^2$/24 hr. The film had a T-Peel strength of 2.4 lb/in. before autoclaving and 0.35 lb/in. after autoclaving for 1 hour at 121° C. at 15 psi.

EXAMPLE 6

(Control) A three layer film structure was prepared by coextrusion. The 5 mil film contained 2.5 mils of copolyesterether as defined above. 0.5 mil of tie layer CXA-3095 resin and 2.0 mils of polyallomer-5L2S. The film had a MVTR of 0.36 g/100 in.$^2$/24 hr and a T-Peel strength before autoclaving 1 hour at 121° C. at 15 psi of 2.1 lb/in. However, after autoclaving the adhesion was greatly reduced to 0.02 lb/in.

EXAMPLE 7

(Control) A coextruded three layer film structure with 4.0 mils of copolyesterether as defined above, 1.5 mils of an adhesive tie layer Lotader AX-8040 resin and 4.2 mils of polypropylene-4240 had a MVTR of 0.26 g/100 in.$^2$/24 hr. The film structure had a T-Peel strength of 2.6 lb/in. before autoclaving and 0.3 lb/in. after autoclaving 1 hour at 121° C. at 15 psi.

EXAMPLE 8

(Control) A five layered film prepared by coextrusion consists of two outer layers of copolyesterether as defined above, a center layer of polyallomer 5L2S and two tie layers of CXA-3101 resin. The film had a total thickness of 8 mils, where the outer layers of copolyesterether were 2.5 mils each, the polyallomer layer was 2.0 mils thick and the tie layers were 0.5 mil each. The film had a MVTR of 0.34 g/100 in.²/24 hr. The T-Peel strength before autoclaving was 2.4 lb/in. and after autoclaving for 1 hour at 121° C. at 15 psi was reduced to 0.28 lb/in.

EXAMPLE 9

(Control) A three layered coextruded film structure was prepared with 3.3 mils of copolyesterether as defined above, 1.4 mils of tie layer Chevron-2260 resin and 2.9 mils of polypropylene-4240. The three layer film structure had a MVTR of 0.31 g/100 in.²/24 hr and a T-Peel strength of 4.3 lb/in. before autoclaving. However, after autoclaving the T-peel strength was reduced to 0.4 lb/in.

TABLE 1
(Results of Examples 1-9)

| Example | MVTR | T-Peel Before Autoclaving lb/in. | T-Peel After Autoclaving lb/in. |
|---|---|---|---|
| 1 | .3 | 4.4 | 2.9 |
| 2 | .3 | 3.7 | 2.7 |
| 3 | .32 | 3.9 | 2.6 |
| 4 | .38 | 3.2 | 0.35 |
| 5 | .44 | 2.4 | 0.35 |
| 6 | .36 | 2.1 | 0.02 |
| 7 | .26 | 2.6 | 0.3 |
| 8 | .34 | 2.4 | 0.28 |
| 9 | .31 | 4.3 | 0.4 |

In Examples 10 thru 16. the polyesterether used has repeat units from trans 1,4-cyclohexanedicarboxylic acid, about 75 mol percent 1,4-cyclohexanedimethanol and about 25 mol percent poly(oxytetramethylene) glycol having a molecular weight of about 1000. Copolyester A has repeat units from terephthalic acid, about 30 mol percent ethylene glycol and about 70 mol percent 1,4-cyclohexanedimethanol. Copolyester B has repeat units from terephthalic acid, about 70 mol percent ethylene glycol and about 30 mol percent 1,4-cyclohexanedimethanol.

Also, in Examples 10 thru 16, the tie layers are described as follows:

Tie Layer A—A copolymer containing mostly repeat units from ethylene, having a melt flow rate (190° C.) of 1.0 g/10 min., a density of 0.88 g/cm³, a tensile strength at break of 30 kg/cm², an elongation at break of >500 percent, Izod impact strength of unbreakable, a D-shore hardness of 16, an A-shore hardness of 72, and a melting point of 75° C.

Tie Layer B—A copolymer containing mostly repeat units from ethylene, and also repeat units from an acrylic ester and maleic anhydride. Physical properties are as follows:

30% comonomer content, melt flow index of 8 g/10 min., density of 0.93 to 0.95 g/cm³.

Tie Layer C—A copolymer containing mostly repeat units from ethylene, but having some repeat units from vinyl acetate. (27% to 29%) physical properties are 154° C. softening point, melt flow index of 5.3 to 6.7 g/10 min., density of 0.955 g/cm³, and tensile strength 24 MPa, tensile modulus of 26 MPa.

Tie Layer D—A copolymer containing mostly repeat units from ethylene but also having repeat units from about 15 mol percent vinyl acetate and about 0.44 percent methylmethacrylate. Physical properties are 87° C. melt point, melt flow index of 2.5 g/10 min., density of 0.931 g/cm³, tensile strength 14.3 MPa, tensile modulus of 32 MPa.

Tie Layer E—A copolymer containing mostly repeat units from ethylene, but having some from vinyl acetate and maleic anhydride. Physical properties are 87° C. melt point, melt flow index of 3.5 g/10 min., density of 0.937 g/cm³, tensile strength of 13.3 MPa, tensile modulus of 33 MPa.

Tie Layer F—A copolymer containing mostly repeat units from ethylene, but having some from an acrylic ester and maleic anhydride. Physical properties are 23% comonomer content, 80° C. Vicat softening point, melt flow index of 10 g/10 min., density of 0.93 to 0.95 g/cm³.

EXAMPLE 10

A three-layer film laminate is coextruded from a blend of 85 percent by weight of polyesterether and percent of Copolyester A for the support sheet, Tie Layer A, and Shell polypropylene WRS7-327 for the inside layer. The melt temperatures are 265° C., 240° C., and 220° C. for support, tie, and inside layers, respectively. Coextrusion block temperature is set at 245° C. Film thicknesses are 5.0, 2.0, and 3.5 mils, respectively. The sheet material is placed against an inside surface of a mold. A substrate thermoplastic polyolefin (84% Shell polypropylene WRS7-327, 12% EPR modified polypropylene and 4% carbon black) is injection molded onto the film with a melt temperature of 439° F. (226° C.) and mold temperature of 120° F. (49° C.). Average peel strength is measured to be 143 g/mm (8.0 lb/in.).

EXAMPLE 11

The same sheet components as for Example 10 are used with the same melt temperatures and film thicknesses. Tie Layer B is used. Injection molding conditions are also the same as those used in Example 1. Average peel strength is 66 g/mm (3.7 lb/in.).

EXAMPLE 12

The same sheet components as for Example 10 are used with the same melt temperatures and Film thicknesses. Tie Layer D is used. Injection molding conditions are the same as for Example 1. Average peel strength is 57 g/mm (3.2 lb/in.).

EXAMPLE 13

A two-layer film of support sheet from Example 10 and a Tie Layer C is coextruded. The melt temperatures are 245° C. and 185° C., respectively. Block temperature is set at 220° C. Film layer thicknesses are 5.5 and 1.0 mils, respectively. Injection molding conditions similar to those of Example 1 are used. Average peel strength is measured to be 84 g/mm (4.7 lb/in.).

EXAMPLE 14

A three-layer film laminate is coextruded from a blend of 75 percent polyesterether and 25 percent Copolyester A (support sheet), Tie Layer A, and Shell polypropylene WRS7-327 for the inside layer. Melt temperatures during coextrusion are 250° C., 224° C., and 195° C., respectively. Coextrusion block temperature is set at 240° C. Film thicknesses are 5.0, 1.0 and 2.0 mils, respectively. The film is placed in the injection molding machine and a thermoplastic polyolefin, Shell WRS7-327 polypropylene, is injected at a melt temperature of 213° C. Mold temperature is 29° C. Average peel strength is measured to be 136 g/mm (7.6 lb/in.).

EXAMPLE 15

For this trial the support sheet is a blend of polyesterether and 40 percent Copolyester A. Tie and inside layers are the same as Example 5. Melt temperatures during coextrusion is 248° C., 198° C., and 189° C., respectively. Film thicknesses and injection molding conditions are the same as for Example 5. Average peel strength is 148 g/mm (8.3 lb/in.).

EXAMPLE 16

In this example, the support layer is a blend of 75 percent polyesterether with 25 percent Copolyester B, the tie layer is Tie Layer A, and the inside layer is high density polyethylene. Melt temperatures of the layers during coextrusion are 249° C., 224° C., and 190° C. Film thicknesses and injection molding conditions are the same as for Example 5. Average peel strength is 213 g/mm (11.9 lb/in.).

Whenever the term "inherent viscosity" (I.V.) is used in this application, it will be understood to refer to viscosity determinations made at 25° C. using 0.50 gram of polymer per 100 mL of a solvent composed of 60 weight percent phenol and 40 weight percent tetrachloroethane.

The "melting point" ($T_m$) of the polymers described in this application are readily obtained with a Differental Scanning Calorimeter.

The strength of the bonds is determined by the so called "Peel Test" based on a modification (i.e., three test specimens) of the ASTM "T-Peel Test" set forth on pages 63 and 64 of the 1964 edition of the Book of ASTM Standards, published by the American Society of Testing Materials, and more specifically identified as Test No. D1876-61-T.

The terms "melt flow" and "melt flow index" are used herein as the amount, in grams, of a thermoplastic resin which can be forced through a given orifice under a specified pressure and temperature within 10 minutes. The value should be determined in accordance with ASTM D 1238.79.

ECDEL copolyesterether. Polypropylene-4240, polyallomer 5L2S are products marketed by Eastman Chemicals Products, Inc.

Gulf 2205 is a copolymer of ethylene and methyl acrylate. The material has a melt index of 2.4 g/10 min and a density of 0.942 g/cc.

CXA 1104 is an ethylene, vinyl acetate terpolymer. The terpolymer has a melt index of 6.0 g/10 min, a density of 0.955 g/cc and a Vicat softening point of 43° C.

CXA 3095 is supplied by Dupont and has a melt index of 2.3 g/10 min, a density of 0.937 g/cc and a Vicat softening point of 82° C.

Lotader AX-8040 is a random terpolymer with ethylene, acrylic ester and maleic anhydride.

CXA 3101 is an ethylene based polymer with vinyl acetate and other functional groups. It has a melt index of 3.5 g/10 min, a density of 0.948 g/cc and a Vicat softening point of 55° C.

Chevron 2260 is an ethylene, methyl acrylate copolymer made by the high pressure, autoclave process. The material has a melt index of 2.0 g/10 min, a density of 0.947 g/cc and a Vicat softening point of 52.7° C.

The following tests are used herein:
Tensile Strength: ASTM-D638
Elongation: ASTM D-638
Izod Impact Strength: ASTM-D256
D-Shore Hardness: ASTM-D2240
A-Shore Hardness: ASTM-D2240
Melting Point: DCS Method
Melt Flow Rate: ASTM-D1238
Moisture Vapor Transmission Rate: ASTM-F372
T-Peel Strength: ASTM-D1876

Unless otherwise indicated, all parts, percentages, ratios, etc., are by weight.

The invention has been described in detail with particular reference to preferred embodiments thereof, but it will be understood that variations and modifications can be effected within the spirit and scope of the invention.

We claim:

1. Sheet material comprising a first layer of copolyesterether, copolyester or a blend thereof, a second layer of polyolefin and a layer of ethylene copolymer intermediate said first and second layers.
   (I) said copolyester having an I.V. of about 0.8 to 1.5 and repeat units from
      (A) a dicarboxylic acid component consisting essentially of 1,4-cyclohexanedicarboxylic acid having a trans isomer content of at least 70%,
      (B) a glycol component consisting essentially of
         (1) about 95 to about 65 mol % 1,4-cyclohexanedimethanol, and
         (2) about 5 to about 35 mol % poly(oxytetramethylene) glycol having a molecular weight of about 500 to about 1100,
   (II) said copolyester having repeat units from terephthalic acid and at least two glycols having 2 to 10 carbon atoms, and
   (III) said ethylene copolymer being a copolymer of ethylene and at least one other unsaturated monomer, said ethylene copolymer having a density of about 0.85–0.91.

2. Sheet material according to claim 1 wherein said copolyester contains repeat units from terephthalic acid, ethylene glycol and 1,4-cyclohexanedimethanol.

3. Sheet material according to claim 1 wherein said ethylene copolymer is a copolymer of ethylene with a monomer selected from maleic acid, fumaric acid, acrylic acid, methacrylic acid, vinyl acetate, acrylonitrile, methacrylonitrile, butadiene and carbon monoxide.

4. Sheet material according to claim 1 wherein said ethylene copolymer has a melt flow rate of about 0.25–40 g/10 min, a tensile strength at break of at least 25 g/cm$^2$, an elongation at break of greater than 100% and a melting point of at least 65°.

5. Sheet material according to claim 4 wherein said ethylene copolymer has a melt flow rate of about 0.5–20 g/10 min, and an elongation at break of greater than 400%.

6. Sheet material according to claim 1 wherein said ethylene copolymer has a melt flow rate of about 0.8–1.2 g/10 min, a tensile strength at break of about 20–40 kg/cm$^2$, an elongation at break of greater than about 50%, an Izod impact strength of unbreakable, a D-shore hardness of about 14–18, an A-shore hardness of about 70–74 and a melting point of about 70°–80° C.

7. Multilayered flexible film material comprising at least one layer of copolyesterether, at least one tie layer, and at least one layer of polyolefin, said tie layer being positioned between each copolyesterether layer and polyolefin layer, the copolyetherester having an I.V. of about 0.8 to 1.5 and repeat units from (A) a dicarboxylic acid component consisting essentially of 1,4-cyclohexanedicarboxylic acid having a trans isomer content of at least 70%,
(B) a glycol component consisting essentially of
  (1) about 95 to about 65 mol % 1,4-cyclohexane dimethanol, and
  (2) about 5 to about 35 mol % poly(oxytetramethylene) glycol having a molecular weight of about 500 to about 1100, the tie layer being a low molecular weight copolymer having ethylene repeat units, a melt flow rate of about 0.5 to about 20, a tensile strength at break of at least 25 kg/cm$^2$, an elongation at break of greater than 400% and a melting point of at least 65° C., and the polyolefin layer being selected from polyethylene, polypropylene and ethylene/propylene copolymers.

8. The film material according to claim 7 wherein said material has a three-layered structure consisting of said copolyesterether and said polyolefin as outer layers and said tie layer as an inner layer.

9. The film material according to claim 7 wherein said material has a five layered structure consisting of, in order from one surface to the other, copolyesterether, tie, polyolefin, tie and polyetherester.

10. The film material according to claim 7 formed by coextrusion of said layers.

11. A container comprising the film material of claim 7.

12. A bag comprising the film material of claim 7.

* * * * *